May 12, 1953 H. RUBEN 2,638,538
AUTOMATIC GAIN CONTROL SYSTEM
Filed May 27, 1949
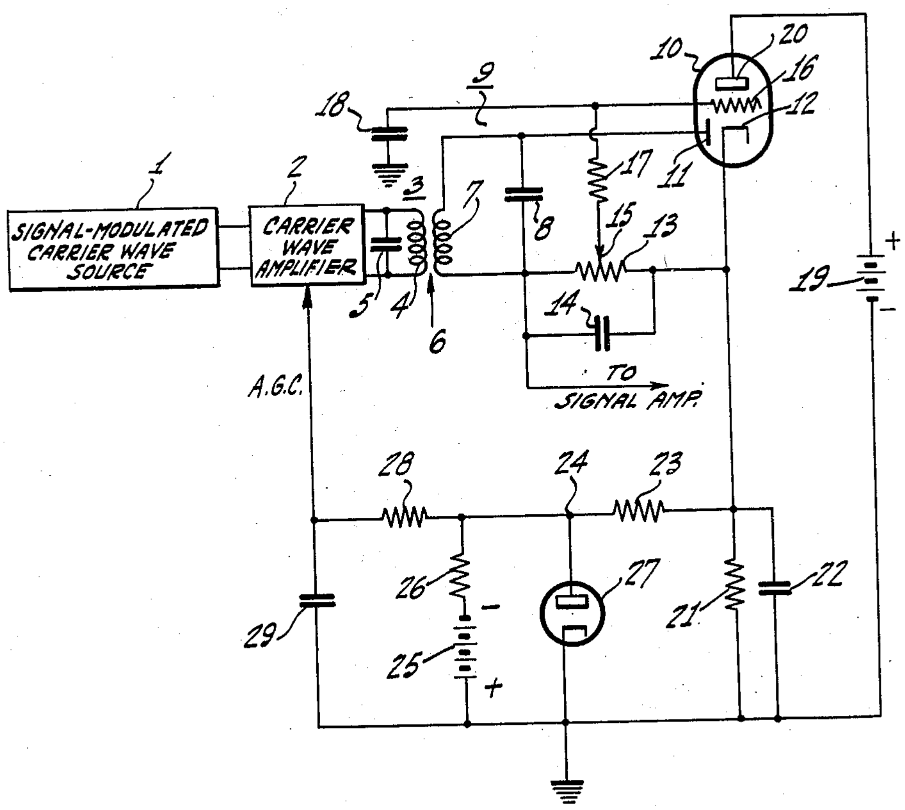
Inventor
HARRY RUBEN
By
Attorney Patented May 12, 1953 2,638,538

UNITED STATES PATENT OFFICE 2,638,538

AUTOMATIC GAIN CONTROL SYSTEM

Harry Ruben, Philadelphia, Pa., assignor to Radio Corporation of America, a corporation of Delaware Application May 27, 1949, Serial No. 95,693

4 Claims. (Cl. 250—20)

This invention relates to automatic gain control systems for use in conjunction with the signal amplifiers of radio receivers, and has particular reference to a system for developing an automatic gain control voltage in radio receivers wherein signal detection is effected at relatively low signal levels.

There are many types of radio receivers where it is desirable to minimize the number of circuit elements employed and to simplify the circuit arrangements and thereby minimize the costs of fabricating the instruments. Radio receivers of such a character include small table models and portable instruments. One of the devices commonly employed to effect such a result is to utilize little or no signal amplification before signal detection is effected. Consequently the signal detection necessarily is accomplished at a relatively low signal level.

It has been found that, where it is desired to provide radio receivers of the character described with automatic gain control facilities, conventional expedients employed in other types of radio receivers are not entirely satisfactory. By reason of the fact that signal detection is effected at a relatively low signal level, the automatic gain control voltage which may be produced by the use of prior art systems is, in most cases, inadequate to maintain the signal level substantially constant. As a result there are present in such receivers appreciable variations in the output signal level resulting from input signal level changes.

In an effort to increase the magnitude of the automatic gain control voltage in radio receivers of the character described, one expedient which has been employed consists of, first, deriving a unidirectional voltage which varies in its average magnitude in accordance with changes in the signal level and, then, combining it with a fixed unidirectional voltage of opposite polarity, thereby to produce a gain control voltage of proper polarity and of somewhat greater magnitude than that which may be secured from the detected signal alone.

One such system employs, in addition to the signal detector, an auxiliary diode, the potential of one of its electrodes varying in accordance with the detected signal and the other electrode being coupled to the input circuit of the receiver which ordinarily is the antenna coupling circuit. There also is impressed upon the electrode of the auxiliary diode, the potential of which changes subject to signal variations, a fixed potential of a polarity opposite to that of the signals. The auxiliary diode then acts as a gating device whereby to feed back signal-controlled energy to the input circuit in opposition to the signal energy impressed upon this circuit from the antenna, for example, to thereby reduce the effectiveness of the received signal upon the radio receiver circuits coupled to the antenna. Such systems have not been completely satisfactory to produce the desired results for the reason that the impedance of a diode is not sufficiently low, and furthermore, it is neccessary to provide a diode and its auxiliary circuit elements in addition to the signal detector.

There also have been used, in radio receivers of the character described, automatic gain control facilities wherein the signal detector also serves as the means for producing the automatic gain control voltage. One such system which is particularly well adapted for use in effecting low level signal detection is the so-called degenerative plate rectification system. The advantage of such a device for accomplishing signal detection is that it has a relatively high impedance input circuit whereby to minimize the loading of the signal circuits preceding the detector. As a consequence, the signal-modulated carrier wave voltage impressed upon the signal detector is at a maximum value. In circuits of this character it is customary to use as the degenerative plate detector an electronic tube of the triode type. However, in order to derive an automatic gain control voltage from such a signal detector it is necessary that this voltage be derived from the anode of the tube, since the load impedance device in which the detected signal voltage is developed is connected in the cathode circuit of the tube. In order to derive an automatic gain control voltage from the anode of the signal detector tube, it is necessary to couple an impedance device in the anode circuit. The traversal of such an impedance device by the space current in the tube effects a voltage drop whereby the anode potential of the tube varies in accordance with the signal. This, of course, is what is desired to produce the automatic gain control voltage. However, since the magnitude of the space current in a detector tube of the triode type is dependent, not only upon the potential of the control grid relative to its associated cathode, but also upon the potential of the anode, it is seen that the space current will vary in an undesired manner, whereby there will be produced distortions in the output signal voltage derived from the cathode-coupled impedance device.

Accordingly, where it is desired to effect degenerative plate rectification and at the same time to derive an automatic gain control voltage from the anode of the signal detector, it is necessary to use as the signal detector tube a multigrid device such as a pentode. Such a tube is one in which the space current is relatively independent of the anode potential and will, therefore, vary only in accordance with the voltage variations of its control grid. In order to employ a tube of the pentode type for the purpose of effecting signal detection and for the development of an automatic gain control voltage, it is necessary to provide additional circuit elements for impressing suitable potentials upon the screen and suppressor grids of such a tube. This provision adds to the cost of the receiver. Furthermore, in order for such a device to function properly, it is necessary that the tube always be in a conducting state so that current may traverse the cathode-coupled impedance device. Such a condition places an additional drain upon the power supply and thereby adds to the cost of operating the radio receiver. Moreover, the output signal voltage derived from such a tube is of a relatively small magnitude by reason of the degenerative manner in which the tube operates. Consequently, considerable signal amplification is subsequently required.

It, therefore, is an object of the invention to provide a novel automatic gain control system wherein there are obviated certain disadvantages of the prior art systems, such as those referred to, and one which is capable of producing gain control voltages of relatively large magnitudes from signal voltages of relatively small magnitudes.

Another object of the invention is to provide an automatic gain control system which is relatively simple and which employs the signal detector in such a manner as to automatically control a relatively large source of unidirectional energy, whereby to produce a gain control voltage which is entirely adequate for maintaining a substantially constant output signal level.

A further object of the invention is to provide a novel automatic gain control system which is capable of producing a gain controlling voltage which varies at a faster rate than the rate at which variations occur in the received signal level.

In accordance with the present invention, there is provided a system for developing an automatic gain control voltage wherein means for demodulating signal-modulated carrier waves, the level of which is subject to variation, is coupled to a source of such carrier waves. From the signals which are recovered in this manner there is derived the low frequency component which also varies in level in accordance with level variations of the carrier waves. This low frequency signal component is inverted to develop a unidirectional voltage of a predetermined polarity relative to a reference potential. This unidirectional voltage varies in level inversely to level variations of the carrier waves. There also is provided a source of a fixed unidirectional voltage of opposite polarity relative to the reference potential. Further, there is provided means for combining the two unidirectional voltages to develop an automatic gain control voltage which varies in magnitude in accordance with level variations of the carrier waves.

In accordance with an important feature of the present invention, the unidirectional voltage derived from the demodulating means is amplified in such a manner as to produce a magnified unidirectional voltage, the level of which changes at a faster rate than the level variations of the carrier waves occur. Also, preferably at the same time, the polarity of the varying unidirectional voltage is reversed relative to the reference potential.

The novel features that are considered characteristic of this invention are set forth with particularity in the appended claims. The invention itself, however, both as to its organization and method of operation, as well as additional objects and advantage thereof, will best be understood from the following description taken in connection with the accompanying drawing.

The single figure of the drawing is a circuit diagram illustrating an embodiment of the invention in its relation to the amplifying system, the gain of which is to be controlled automatically.

Referring now to the drawing, there is shown in detail only that portion of a radio receiver to which the present invention pertains. There is illustrated a signal-modulated carrier wave source 1 which, for example, may be the carrier wave signal receiving circuits and apparatus of a radio receiver and, accordingly, may be entirely conventional. The source 1 is coupled to a carrier wave amplifier which also may be conventional and, for example, may include one or more stages of a radio frequency amplifying system and/or a frequency converter and/or one or more stages of an intermediate frequency amplifying system. Such apparatus is represented herein as a carrier wave amplifier 2. The output circuit of the carrier wave amplifier includes a tuned circuit 3 comprising a coil 4 and a resonating capacitor 5 by means of which the circuit 3 is resonated at the frequency of the carrier waves impressed thereon. The coil 4 forms the primary winding of a transformer 6 which also is provided with a secondary winding consisting of a coil 7 having connected in shunt therewith a capacitor 8, by means of which there is formed a tuned circuit 9 resonated at the frequency of the carrier waves derived from the amplifier 2.

The tuned secondary circuit 9 is coupled to the diode section of an electronic tube 10. As illustrated herein, this tube is a combined diode-triode such as an RCA type 6AT6, although it will be appreciated, after a consideration of subsequent portions of the specification, that the diode and triode elements may, if desired, be enclosed in separate envelopes. One terminal of the resonant circuit 9 is coupled directly to the anode 11 of the diode. The other terminal of this circuit is coupled to the common cathode 12 of the tube 10 through a load resistor 13, which is bypassed for frequencies of the order of the carrier wave frequency derived from the amplifier 2 by means of a capacitor 14. The relatively high potential terminal of the resistor 13 is coupled, as indicated, to a signal amplifier in a conventional manner, not shown.

A suitable proportion of the signal voltage developed in the resistor 13 is derived by means of a sliding contact 15 and impressed upon the control grid 16 of the triode section of the tube 10. The grid circuit includes a series resistor 17 and a capacitor 18 connected in shunt therewith to ground, thereby forming a filter network, whereby the instantaneous signal component of the unidirectional voltage developed in the resistor 13 is removed. In this manner there is impressed upon the control grid 16 a unidirectional voltage representing only the relatively low frequency components of the unidirectional voltage developed in the resistor 13. Space current for the triode section of the tube 10 is provided by a suitable source of unidirectional energy such as a battery 19, the positive terminal of which is directly connected to the anode 20 of the tube. The space current circuit is completed through a resistor 21 coupled between the cathode 12 and ground and bypassed for carrier frequency components by a capacitor 22.

The cathode-connected terminal of the resistor 21 also is coupled by a resistor 23 to a voltage comparison point 24. There also is provided a source of unidirectional energy of negative polarity relative to ground which may be represented by the battery 25, the negative terminal of which is coupled by a resistor 26 to the voltage comparison point 24. A diode 27 also is connected in the polarity shown between the voltage comparison point 24 and ground.

As will be demonstrated presently, a unidirectional voltage is developed at the point 24 and is of suitable character and polarity for use in controlling the gain or amplification of a signal amplifier. The point 24, accordingly, is further coupled by a resistor 28 to the automatic gain control bus A. G. C. and thence to the signal amplifiers. The resistor 28 and a capacitor 29 constitute a filter system for the automatic gain control voltage.

The automatic gain control system in accordance with the present invention operates, first, by effecting demodulation of the carrier waves derived from the amplifier 2. The demodulation is accomplished by means of the diode 11, 12 so that signal voltages are developed in the diode load resistor 13. The polarity of these voltages, at the high potential terminal of the load resistor, is negative with respect to ground. The relatively low frequency components of the signal voltages developed in the resistor 13 are impressed upon the control grid 16 of the triode section of the tube 10 in such a manner that, as the level of the signals increases, the control grid is rendered more negative relative to its associated cathode 12, thereby reducing the magnitude of the space current in the tube.

As a consequence, a voltage of positive polarity relative to ground is developed at the high potential terminal of the resistor 21 and this voltage has a magnitude which varies inversely to the variations in the level of the signal-modulated carrier waves. In other words, as the carrier wave level increases, the magnitude of the voltage developed by the resistor 21 decreases. The magnitude of the voltage derived from the battery 25 is somewhat greater than the maximum automatic gain control voltage that is considered necessary for effectively controlling the signal output lever of the carrier wave amplifier 2. In a preferred embodiment of the invention this fixed negative voltage is made approximately 25 per cent. greater than the maximum gain control voltage considered necessary. However, in the event that the positive voltage derived from the resistor 21 becomes greater in magnitude than the negative voltage of the battery 25, the diode 27 becomes conducting and thereby prevents the voltage at the comparison point 24, and therefore the automatic gain control voltage, from becoming positive relative to ground.

It may be seen that the automatic gain control voltage is substantially the algebraic sum of the fixed negative voltage derived from the battery 25 and the varying positive voltage derived from the resistor 21. When the signal level is relatively low, the magnitude of the negative unidirectional voltage impressed upon the control grid 16 of the tube 10 also is relatively low, and the magnitude of the space current in the tube is relatively high. Consequently, the magnitude of the positive voltage developed in the resistor 21 is relatively high and the automatic thereby effecting little or no control of the gain of the amplifier 2.

However, a substantial increase in the level of the signal-modulated carrier waves effects the development by the diode load resistor 13 of a greater negative unidirectional voltage for impression upon the control grid 16 of the tube 10. The magnitude of the space current in the tube therefore is reduced, thereby effecting a decrease in the magnitude of the positive voltage developed by the resistor 21. In such a case the voltage at the point 24 will be determined more by the battery 25 than by the resistor 21, and accordingly, will have some value of a negative polarity relative to ground. When this negative voltage is impressed upon the amplifier 2, it will effect a decrease in the gain of the amplifier whereby to maintain the level of the signal-modulated carrier waves developed in the resonant output circuit 3 substantially constant.

The automatic gain control system in accordance with the present invention is particularly effective by reason of the fact that the varying positive voltage is developed in the output circuit of the triode section of the tube 10. In this manner the varying positive voltage which is developed by the resistor 21 may be made to vary at a rate which is greater than the rate at which the level of the signal-modulated carrier waves varies. It will be appreciated that a voltage of this character is much more effective in producing the desired automatic gain control of the carrier wave amplifier than a voltage which varies at a rate no greater than the rate at which the level of the carrier waves varies.

As in other automatic gain control systems, the present system may be provided with facilities for effecting whatever delay may be desired. In the present instance delayed automatic gain control may be effected, for example, by suitably choosing the voltage of the battery 25 and/or by providing the diode 27 with suitable conventional circuits.

It may be seen from the foregoing description of one embodiment of the invention that there is provided a comparatively simple and inexpensive automatic gain control system for a signal amplifier which is capable of developing gain control voltages of relatively large magnitudes from signal voltages of relatively small magnitudes. It will be obvious to those skilled in the art, however, that the invention may be embodied in forms other than that specifically disclosed herein for illustrative purposes. Accordingly, the scope of the invention is to be determined by reference to the appended claims.

What is claimed is:

1. A system for developing an automatic gain control voltage, comprising a source of signal-modulated carrier waves, the level of which is subject to variation, means coupled to said source to demodulate said carrier waves, thereby to develop a first unidirectional voltage of predetermined polarity relative to a reference potential, said voltage being modulated in accordance with said signals and varying in level in accordance with level variations of said carrier waves, an electronic amplifier tube having a cathode circuit, and impedance device connected in said cathode circuit, said electronic tube being coupled to said demodulating means to develop across said cathode impedance device a second unidirectional voltage of opposite polarity relative to said reference potential and varying in level in correspondence with said first unidirectional voltage, a source of a fixed unidirectional voltage of said predetermined polarity, said fixed unidirectional voltage source being connected in shunt with said cathode impedance device in opposite polarity to the voltage developed across said impedance device for combining said second unidirectional voltage and said fixed unidirectional voltage to develop an automatic gain control voltage varying in magnitude in accordance with level variations of said carrier waves, and unidirectional conducting means connected in shunt with said fixed unidirectional voltage being operable to prevent voltage of a predetermined polarity from being produced by the combination.

2. A system for developing an automatic gain control voltage, comprising a source of signal-modulated carrier waves, the level of which is subject to variation, a demodulator coupled to said source and having an output circuit in which to develop said signals varying in level in accordance with level variations of said carrier waves, an amplifier having an input circuit coupled to said output circuit and a cathode circuit impedance element in which to develop a voltage of one polarity relative to a reference potential and varying in level inversely to level variations of said carrier waves, a source of a fixed voltage of opposite polarity relative to said reference potential, means connecting said cathode impedance element and said source of fixed voltage in shunt in opposing polarity for combining said varying voltage and said fixed voltage to develop an automatic gain control voltage varying in magnitude in accordance with level variations of said carrier waves, and a unidirectional conducting device connected in shunt with said cathode impedance element being rendered conductive upon said varying voltage of said one polarity exceeding said fixed voltage of the opposite polarity.

3. A system as defined in claim 2, in which one terminal of said impedance element is connected directly to the cathode of said vacuum tube and the other terminal of said impedance element is coupled to said point of reference potential.

4. A system as defined in claim 3, in which said other impedance element terminal is connected directly to said point of reference potential, whereby said varying voltage is of positive polarity relative to said reference potential, and in addition said fixed voltage is of negative polarity relative to said reference potential.

HARRY RUBEN.

References Cited in the file of this patent

UNITED STATES PATENTS

| Number | Name | Date |
|---|---|---|
| 1,889,018 | Gilbert | Nov. 29, 1932 |
| 2,018,982 | Travis | Oct. 29, 1935 |
| 2,103,637 | Poch | Dec. 28, 1937 |
| 2,153,747 | Farnham | Apr. 11, 1939 |
| 2,171,657 | Klotz | Sept. 5, 1939 |
| 2,200,049 | Van Loon | May 7, 1940 |
| 2,241,553 | Kallman et al. | May 13, 1941 |

FOREIGN PATENTS

| Number | Country | Date |
|---|---|---|
| 380,445 | Great Britain | Sept. 13, 1932 |
| 43,779 | France (2d addition to 750,665) | Aug. 30, 1934 |
| 759,727 | France | Feb. 7, 1934 |